United States Patent Office 3,202,519
Patented Aug. 24, 1965

3,202,519
CARBON-MINERAL REFRACTORY
Carleton B. Scott, Los Alamitos, Calif., assignor to Union Oil Company of California, Los Angeles, Calif., a corporation of California
No Drawing. Filed Oct. 9, 1961, Ser. No. 143,554
12 Claims. (Cl. 106—56)

This invention relates to refractory compositions comprising a mineral filler bonded and cemented with vitreous carbon.

Refractory compositions have, in the past, been prepared employing a great variety of ingredients and bonding agents. Perhaps the most common are those employing a vitreous binder obtained by the vitrification of clay. Other refractories comprise various metal and metal oxide solutions, fused metal oxides, etc. In general, however, all these refractories have poor thermal and mechanical shock strength.

Improvements have been made in the shock strength of refractories by use of various metals with metal oxides, carbides, etc., to produce cermets such as chromium-alumina; nickel-titanium carbide; etc. Unfortunately, however, the expense of such refractories limits their widespread application.

It is an object of this invention to provide an inexpensive refractory composition having a high degree of thermal and mechanical shock resistance.

It is also an object of this invention to provide a simple and direct method of manufacturing said refractory.

Other and related objects will be apparent from the following description of my invention.

I have found that the aforementioned objectives are achieved by cementing metal oxide powders with vitreous carbon. To prepare the refractory, the metal oxide powders are molded into the desired shape by use of a low temperature binder, or are packed into a container, and thereafter fired in a hydrocarbon atmosphere at about 900° to about 1150° C. for sufficient time to deposit vitreous carbon throughout the matrix. Generally between about 5 and 75, preferably between about 10 and 40, weight percent vitreous carbon is so deposited.

The low temperature binder, when used, can be water, natural or synthetic resins or hydrocarbons such as high boiling petroleum distillates, reduced crudes, asphalts, pitches, etc. If desired, the low temperature binder can be omitted and the loose powders can be packed into the desired shape, preferably in a container to permit their subsequent handling and introduction into the vitreous carbon furnace. The container can be perforated or constructed with sides of a fine mesh screen to expose several or all sides of the matrix to the hydrocarbon vapor.

Vitreous carbon is an allotropic form of carbon having a unique X-ray diffraction pattern and an extremely hard surface with excellent thermal and mechanical shock resistance. This form of carbon is deposited from hydrocarbon gases by cracking the latter at temperatures between about 900° and 1150° C.

Although vitreous carbon has been used in the past to prepare electrical carbon resistors by deposition of a conductive film on a ceramic blank, heretofore, there has been no realization of the very desirable bond strength of this carbon for cementing metal oxides into a refractory.

Various metal oxides can be employed to form the matrix of the refractory. Among suitable oxides are silica, alumina and the oxides of the metals of Groups IIA, IVB, VB, VIB of the Periodic Table, including magnesia, beryllia, calcium oxide, zirconia, titania, vanadium oxide, chromia, molybdenum oxide, manganese oxide, etc. These oxides can be used separately or in admixture to form the matrix of my refractories. Relatively abundant sources of these metal oxides can be used such as diatomaceous earth, lime, bauxite, pyrolusite, etc., which can be pulverized to the desired fineness and used as the matrix. If desired, petroleum coke, graphite, or other finely divided form of carbon can be admixed with the metal oxide in amounts comprising between about 5 and 95 weight percent of the blend, preferably between about 10 and 50 weight percent.

The usual grinding and screening of the metal oxide to the desired size range heretofore used in the refractory industry is useful in my invention. Generally, it is preferred to employ an admixture of two or more screen size portions so as to obtain the maximum packing of the particles, e.g., proportions of course to fine size between about 40–75 percent coarse and 45–50 fine, preferably 50–55 coarse and 45–50 fine, can be used. The actual size range similarly can be widely varied; however, a coarse size range between about 20 and 150 mesh, preferably between 60 and 100 mesh, and a fine size range passing an 80 mesh, preferably passing about a 200 mesh screen, are generally employed.

After the metal oxides have been crushed and screened, they are admixed to obtain the aforedescribed desired distribution of size ranges and to the desired combination of metal oxides. The powders can thereafter be packed into the aforementioned container and placed in the vitreous carbon furnace, or a suitable low temperature binder can be added to impart plasticity and permit molding of the powders to the desired shape.

As previously mentioned, the container comprises a mold for the powders and can have perforated or screen sides. Various materials can be used for the container, e.g., nickel chrome alloy steels or various ceramics having softening points in excess of 1150° C., such as fused alumina, spinel, silica, quartz, high alumina firebrick, chrome-magnesite, beryllia, thoria, zirconia, etc. The presence of boron or borides inhibits the deposition of vitreous carbon and, therefore, the containing vessel is preferably treated with a boron compound to deposit a film of boron on its surfaces. Preferably the container is dipped or sprayed with a solution of boric acid, about 0.5 to about 30 weight percent concentration. In other techniques, the container can be boronized by heating in a diborane atmosphere at about 650° to about 800° C.

Preferably, the container or the coating thereon can compromise the various metal borides such as aluminum boride, silicon boride, hafnium boride, vanadium boride, chromium boride, molybdenum boride, etc. The container, if constructed from such metal borides is fabricated by hot pressing of the boride powders. Coatings of metal borides can be accomplished by thermal decomposition of a mixed boron halide, e.g., boron trichloride, and metal halide, e.g., aluminum chloride, vapor in the manner well known in the art.

In lieu of, or in combination with, the container, various low temperature binders can be used to consolidate the powders; the most common being water. Generally between about 2 to 20 weight percent water can be added to the blended metal oxide powder. Preferably, to minimize shrinkage of the mold during drying, the amount of water added is limited to no greater than that amount needed to impart a sufficient degree of plasticity to the powder; about 2 to 10 weight percent. Some of the oxides, notably calcium oxide, react with some of the water, while other oxides readily hydrate. Accordingly, larger amounts of water are preferred with these oxides, between about 8 to 20 percent being employed.

To avoid the shrinkage and internal stresses problem encountered during drying of the molded powders containing water as a low temperature bonding agent, various natural and synthetic resins can be used in its stead. Examples of such resins are: casein, rosin, gum kauri, phenol-formaldehyde, urea-formaldehyde, cellulose acetate, polyesters, etc. These resins can be used in amounts between about 0.5 and 10 weight percent of the final plastic mass; preferably between about 1 and 5 weight percent. The resin is incorporated into the powdered metal oxide matrix at any point during its preparation; however, it is preferred to add the resin, either as a solid powder or liquid, during the blending step. Preferably, the resin is added as a liquid, dissolved in a suitable solvent, e.g., as an aqueous latex solution, or in an organic solvent such as toluene, acetone, benzene, formamide, dichlorobenzene, methyl ethyl ketone, diethyl ether, etc. The solvent is evaporated and the resin hardened by drying to cement the oxide powders into a molded shape with sufficient consolidation to permit handling and introduction of the molded shape into the vitreous carbon furnace.

Other suitable low temperature bonding agents include petroleum, petroleum distillates and residuum, asphalts, tars, waxes, reduced crudes, i.e., bottoms boiling above about 750° F., coker feeds, etc. During the vitreous carbon impregnation, these binders are reduced to coke which is bonded by the vitreous carbon. If desired, between about 1 and 30 weight percent of the final plastic mass can comprise a suitable high boiling petroleum pitch asphalt or reduced crude.

The plastic mass comprising the powdered oxide blend and water or other low temperature bonding agent is thereafter molded to the desired shape and size. The material prior to molding can have a slurry to gel consistency. If desired, thixotropy can be imparted to this slurry or gel by the addition of very finely divided metal oxide powders, e.g., silica flour, alumina, etc., having particle sizes between about 1 and 10 microns in amounts between about 0.1 and 5 weight percent.

The plastic mass is thereafter molded with conventional techniques to the desired shape and size. Because the vitreous carbon deposit permeates into the matrix, the maximum size of refractory is not unduly limited and refractory brick having a thickness as great as 4 inches can be prepared with a vitreous carbon binder. The molding is suitably accomplished with conventional press and extrusion techniques wherein pressure of 25 to 100,000 p.s.i. are applied to mold the powders. With the application of high pressures, it is important to deaerate the molded powders so as to prevent their cracking upon release of the pressure. This is accomplished in the manner apparent to those skilled in the art by a slow application rate of pressure, double pressing, vacuum deairing, etc.

When a thermosetting resinous binder such as urea-formaldehyde or phenol-formaldehyde is employed, it is preferred to heat the composition during the molding operation to about 80°–150° C. and thereby harden the binder.

When high melting point pitches or tars are employed, it is also desired to heat the molded powders slightly to melt or soften the pitch and thereby obtain sufficient plasticity of the powders to permit their molding.

The molded powders are thereafter dried and then bonded wtih vitreous carbon. The drying operation removes any moisture or solvent which may have been added with the resin binder or to impart plasticity to the oxide powders. To prevent a rapid degassing of the refractory, a slow rate of heating is applied, generally between about 1° and 50° C. per minute; preferably about 5° to 25° C. per minute. Suitably, the drying step can be performed in the furnace used for vitreous carbon deposition and thus constitute the preheating portion of the latter step.

In any event, upon heating to between about 100° and 200° C., the solvents and/or adsorbed moisture are removed from the molded refractory. When the firing is continued to the vitreous carbon deposition temperature, about 900° to about 1150° C., various changes occur, including carbonization of any organic matter present and removal of any chemically combined or strongly hydrated water. After removal of the major portion of water, i.e., the adsorbed water, the heating rate can be increased to about 25° to 100° C./minute, depending upon the geometry of the shape being heated.

The vitreous carbon is deposited on the powders by the introduction of a hydrocarbon vapor into the furnace atmosphere after the furnace and molds have been heated to at least about 900° C. Suitably, the introduction of the hydrocarbon vapor is preceded by a purging of the furnace with an inert gas such as hydrogen, nitrogen, argon, helium, etc.; however, if desired, the drying and vitreous carbon deposition can be performed in a single furnace with a hydrocarbon rich atmosphere.

When the drying and preheating of the mold is performed in an atmosphere of the aforementioned inert gases, the hydrocarbon can be introduced so as to displace the entire furnace atmosphere; more suitably, however, the furnace gases are merely enriched with hydrocarbon vapor until the hydrocarbon constitutes between about 5 and 95 volume percent of the vapors; preferably between about 50 to 90 percent.

To obtain uniform deposition of the vitreous carbon, it is necessary to flow the gas across the refractories at a uniform rate while maintaining a reasonably constant hydrocarbon concentration in the gas. Desirably, this is accomplished by moving the refractories through the furnace at a fixed rate of speed while admitting a constant flow of hydrocarbon into the furnace at one or more fixed points and expelling the gas at other fixed points.

The period during which the molded powders are subjected to the hydrocarbon vapors depends on the temperature, thickness of article, its porosity and concentration of hydrocarbon vapor in the furnace. Generally between about 1 and 2 hours at 1100° C. are sufficient for the vitreous carbon to be deposited to a depth of about 2 inches. In practice, time periods between about 0.25 and 10 hours will generally be used. In general, the amount of vitreous carbon so deposited amounts to between about 5 and 75 weight percent, preferably between about 10 and 40 percent. Any adverse change of the aforementioned variables can extend the aforementioned period such as operation at the lower temperatures of the range, reduction in hydrocarbon concentration, etc., so that the time period can be varied at will, from about a few minutes to a week or more.

Various hydrocarbons can be used for the deposition of vitreous carbon such as the normal and branched chain aliphatics, aromatics and alicyclics, having between 1 and about 20 carbons, e.g., methane, ethane, propane, butene, isobutane, cyclopentane, pentane, hexene, isohexene, cyclohexane, heptane, isooctane, benzene, toluene, xylene, etc. If desired, various high boiling hydrocarbons can be entrained in the vapor stream, which can constitute any of the aforementioned hydrocarbons, hydrogen or an inert gas such as nitrogen, helium, argon, etc. Various condensed ring aromatics are preferred for this use, e.g., naphthalene, tetralin, Decalin, methylnaphthalenes, anthracene, phenanthrene, pyrene, chrysene, picene, benzpyrene, etc. Generally between about 1 and 25 percent of the atmosphere can comprise the aforementioned entrained high boiling condensed aromatics.

The resulting refractory product is cooled and withdrawn from the furnace. Because of the high thermal shock resistance of the refractory, its cooling need not be as carefully controlled as with conventional refractories, and if desired, the refractory can be quenched to ambient temperatures. Generally, however, the refractories are merely removed from the furnace and cooled in the atmosphere. To preclude oxidation an inert or reducing atmosphere is preferably used for the cooling, such as nitrogen, helium, argon, hydrogen, methane, etc.

The refractories are very hard, gray or black in appearance with a metallic lustre to their surface. When tested with a Shore Durometer, their hardness is from about 50 to 100 "D" scale. When quenched from 1000° C. by immersion in a bath of water, the solid refractories do not crack or spall, but are entirely shock resistant. The mechanical strength of the refractories so prepared is excellent, ingots surviving drops of about 20 to about 30 feet onto a ¼-inch supported steel plate without shattering or crumbling at their edges. The refractories are also extremely inert chemically, e.g., calcium oxide so bonded is unattacked by water, acids, alkalies, etc., and the other oxide refractories show similar inertness.

The following examples will illustrate my invention:

*Example 1*

Calcium oxide, powdered to pass a 100 mesh screen was admixed with water and, after hydration, molded into cylinders, each one-inch long and ¾-inch in diameter. The cylinders were dried and calcined at 742° C. for one hour to remove moisture and then placed in a furnace for vitreous carbon deposition. The samples were heated for 30 minutes at the test temperature in an argon atmosphere and thereafter methane at 0.3 liter per minute was passed through the furnace. The results are tabulated below, demonstrating the temperature range necessary for vitreous carbon bonding:

| Sample | Temperature, ° C. | Time, minutes | Vitreous carbon, weight percent | Hardness, Shore "D" |
|---|---|---|---|---|
| 1 | | | 0 | 5 |
| 2 | 900 | 60 | 2.0 | 5 |
| 3 | 1,000 | 60 | 18.3 | 32 |
| 4 | 1,100 | 60 | 33.7 | 80 |
| 5 | 1,150 | 50 | 28.7 | 90 |
| 6 | 1,200 | 50 | (1) | (1) |

1 Coated with soot.

*Example 2*

Calcium oxide cylinders, prepared as in Example 1, were subjected to varied lengths of time in the furnace while at 1100° C. All other conditions were as in Example 1. The following results were obtained:

| Sample | Time at 1100° C., minutes | Vitreous carbon, weight percent | Hardness, Shore "D" |
|---|---|---|---|
| 7 | 5 | 9.4 | 5 |
| 8 | 15 | 14.0 | 30 |
| 9 | 30 | 24.5 | 80 |
| 10 | 60 | 33.7 | 80 |
| 11 | 120 | 37.3 | 95 |

*Example 3*

Molded cylinders of 60.9 weight percent calcium oxide and 39.1 weight percent petroleum coke passing a 140 mesh screen were calcined for one hour at 750° C. and then bonded with vitreous carbon at 1100° C. for varied time periods. The following data were obtained:

| Sample | Time, minutes | Vitreous carbon, weight, percent | Hardness, Shore "D" |
|---|---|---|---|
| 12 | 15 | 4.2 | 15 |
| 13 | 30 | 21.8 | 65 |
| 14 | 60 | 35.1 | 85 |
| 15 | 90 | 36.7 | 95 |

*Example 4*

A diatomaceous earth, chiefly silica, with moderate amounts of iron and aluminum oxides and slight amounts of magnesium, sodium and titanium oxides was ground to a fine powder. A first sample was molded at 2000 p.s.i. into a ¾-inch diameter cylinder, one inch long; a second sample was admixed with 10 weight percent water and similarly molded at 4500 p.s.i.; a third sample was admixed with 20 weight percent water and similarly molded. The molded pills were placed in the furnace and heated to 1000° C. and then treated with methane for one hour. The pills after bonding with vitreous carbon withstood drops of 20 feet onto a ¼-inch steel plate without damage. The following summarizes the results:

| Sample | Low temp. binder | Temp., ° C. | Firing rate, ° C./min. | Vitreous carbon, wt.percent | Hardness, Shore "D" |
|---|---|---|---|---|---|
| 16 | None | 1000 | 23 | 22 | 85 |
| 17 | 10% H²O | 1000 | 10 | 15 | 85 |
| 18 | 20% H²O | 1000 | 10 | 19 | 85–90 |

Two portions of similarly ground rock were admixed with 10 and 20 weight percent vacuum reduced crude having a coking value, i.e., weight percent yield of coke, of about 10 percent. The admixtures were molded into ⅜-inch diameter pills at 4500 p.s.i. and 100° C. The reduced crude was diluted in benzene to facilitate its admixing with the powdered rock. Prior to molding, the benzene was evaporated. The pills were bonded with vitreous carbon at 1000° C. for one hour. The following summarizes the results:

| Sample | Low temp. binder | Firing rate, ° C./min. | Vitreous carbon, wt.percent | Hardness Shore "D" |
|---|---|---|---|---|
| 19 | 10% reduced crude | 10 | 12 | 80 |
| 20 | 20% reduced crude | 10 | 23 | 85 |

The preceding examples are intended solely to illustrate my invention and are not to be unduly limiting thereof. My invention comprises the ingredients and steps, or obvious equivalents thereof, set forth in the following claims.

I claim:

1. A refractory composition having a high degree of thermal and mechanical shock resistance consisting essentially of a matrix of metal oxide powders cemented together substantially entirely by vitreous carbon deposited from a hydrocarbon vapor at 900° to 1150° C., said refractory comprising from 5 to about 75 weight percent of said vitreous carbon and being free of vitreous ceramic bonds.

2. The composition of claim 1 wherein said metal oxide is calcium oxide.

3. The composition of claim 1 wherein said metal oxide is diatomaceous earth.

4. The composition of claim 1 wherein said refractory contains about 10 to about 40 weight percent vitreous carbon.

5. The method of making a refractory which comprises admixing a low temperature binder with a metal oxide powder to form a plastic matrix, molding said plastic matrix to obtain a molded object, subjecting said molded object to a hydrocarbon vapor at a temperature between about 900° and about 1150° C. for a time between about 0.25 and 10 hours, sufficient to deposit between about 5 and about 75 weight percent vitreous carbon throughout said molded object and to bond said metal oxide powder substantially entirely with said vitreous carbon and form said refractory.

6. The method of claim 5 wherein said low temperature binder is water.

7. The method of claim 5 wherein said low temperature binder is a hydrocarbon.

8. The method of claim 5 wherein said low temperature binder is a resin.

9. The method of claim 5 wherein between about 10 and about 50 weight percent of said matrix comprises finely divided coke.

10. The method of making a refractory which comprises compacting metal oxide powders into a container and subjecting said container and compacted metal oxide powder to a hydrocarbon vapor at a temperature between about 900° C. and about 1150° C. for a time between about 0.25 and 10 hours, sufficient to deposit between about 10 and about 40 weight percent vitreous carbon throughout said powders and cement said powders substantially entirely with said vitreous carbon into a refractory.

11. The method of claim 10 wherein said container is coated with a boron compound prior to its use to deposit a film of boron on its surface.

12. The method of claim 10 wherein said container is comprised of a metal boride.

References Cited by the Examiner
UNITED STATES PATENTS
2,487,581   11/49   Palumbo _____ 252—508

TOBIAS E. LEVOW, *Primary Examiner.*

JOHN H. MACK, *Examiner.*